United States Patent

[11] 3,584,773

| [72] | Inventors | Francis John Grove<br>Eccleston, Saint Helens;<br>Donald Curtis Wright, Blackrod, Bolton;<br>Francis M. Hamer, Ormskirk, all of,<br>England |
|---|---|---|
| [21] | Appl. No. | 810,249 |
| [22] | Filed | Mar. 25, 1969 |
| [45] | Patented | June 15, 1971 |
| [73] | Assignee | Pilkington Brothers Limited<br>Liverpool, Lancashire, England |
| [32] | Priority | Mar. 29, 1968 |
| [33] | | Great Britain |
| [31] | | 15302/68 |

[54] CUTTING OF GLASS
6 Claims, 17 Drawing Figs.

[52] U.S. Cl. .................................................. 225/2,
225/3, 225/93.5
[51] Int. Cl. .................................................. B26f 3/08

[50] Field of Search ......................................... 225/1, 2, 3,
93.5

[56] References Cited
UNITED STATES PATENTS
| 2,298,528 | 10/1942 | Causse ........................ | 225/2 X |
| 2,425,123 | 8/1947 | Quayle et al. ................. | 225/2 X |
| 2,982,456 | 5/1961 | Hsu et al. ..................... | 225/2 |

FOREIGN PATENTS
| 1,048,286 | 11/1966 | Great Britain ................ | 225/2 |

Primary Examiner—Frank T. Yost
Attorney—Morrison, Kennedy and Campbell

ABSTRACT: Glass is cut by employing high frequency dielectric heating of the glass through its thickness along a path which embraces a cutting line to cause a controlled fracture to run along the cutting line from a weakened point on the glass surface.

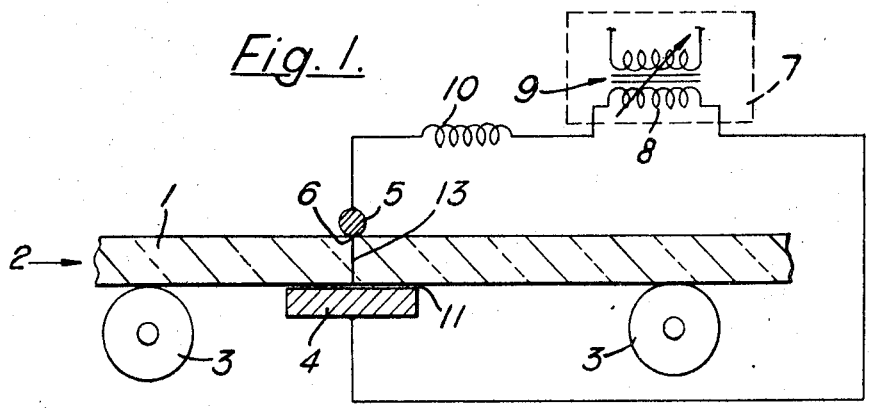
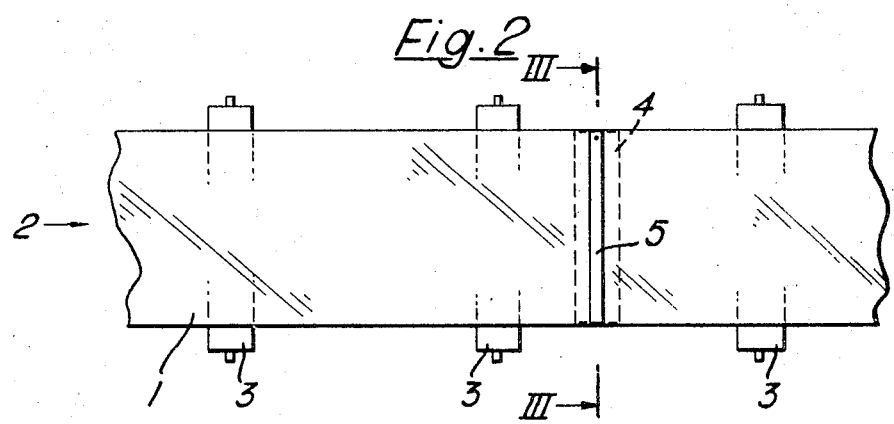
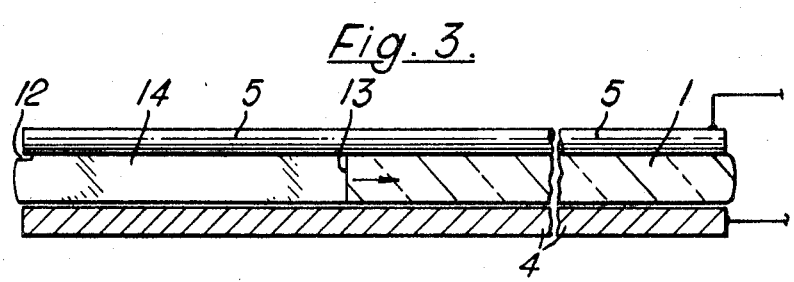
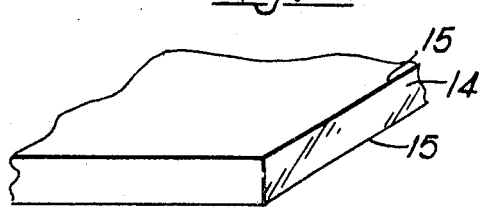
Inventors
FRANCIS JOHN GROVE,
DONALD CURTIS WRIGHT &
FRANCIS MICHAEL HAMER
By
Morrison, Kennedy & Campbell
Attorneys Inventors
FRANCIS JOHN GROVE,
DONALD CURTIS WRIGHT &
FRANCIS MICHAEL HAMER
By
Morrison, Kennedy & Campbell
Attorneys

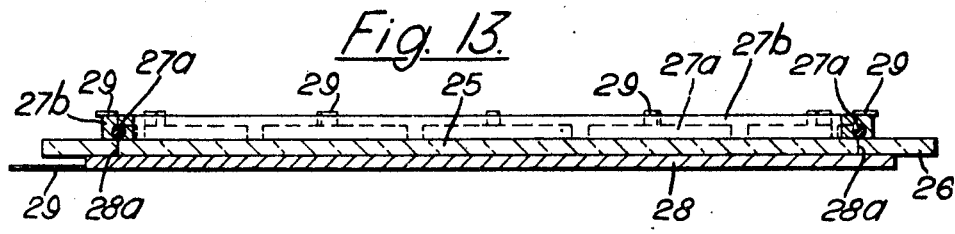
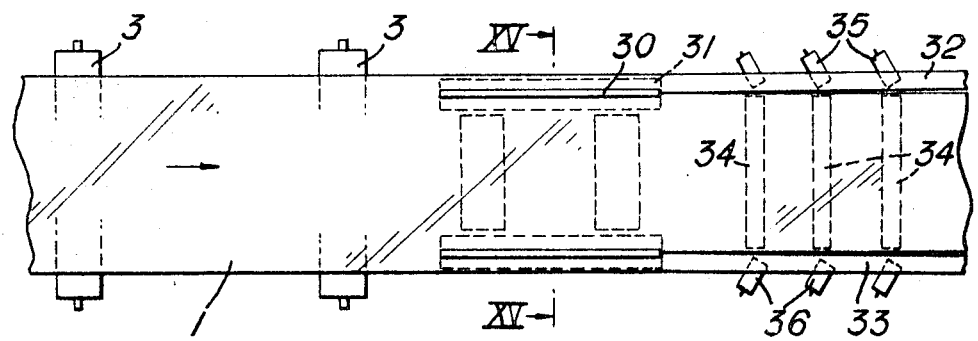
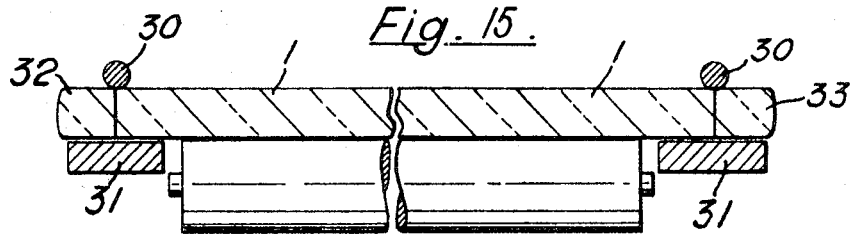

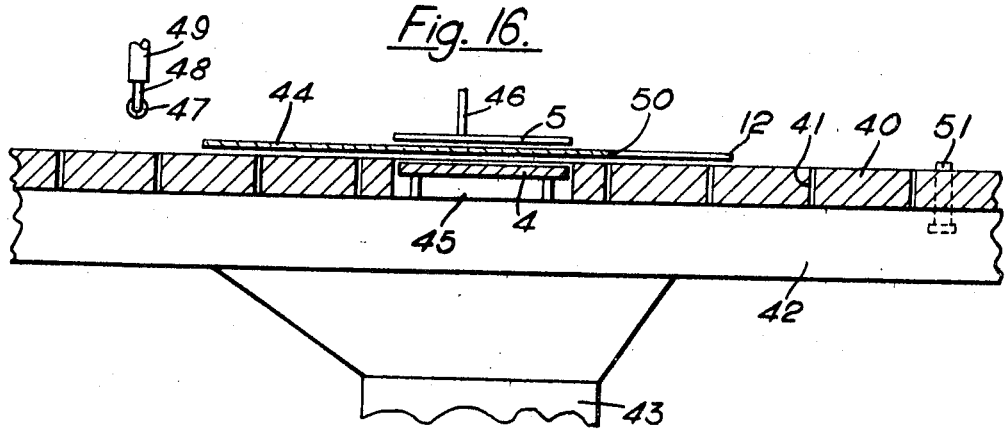
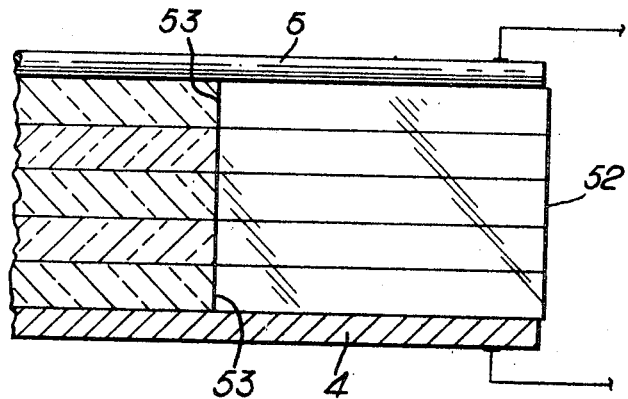

CUTTING OF GLASS

BACKGROUND OF THE INVENTION

This invention relates to the cutting of glass and more especially to the cutting of sheets of glass from a larger glass sheet, or from a continuous ribbon form of glass, or the cutting of shaped pieces of glass from a larger piece of glass.

It is a main object of the present invention to provide a dielectric heating technique for use in the cutting of glass by controlled propagation of a crack along a preferred cutting line.

SUMMARY

According to the invention a method of cutting glass along a predetermined cutting line comprises subjecting the glass to a high frequency electric field through its thickness along a path which embraces the cutting line to heat the glass through its thickness along that path to a temperature which is above that of the surrounding glass and at which the glass can support stress, to cause a controlled fracture to run along the cutting line.

The invention may be employed for the continuous cutting of flat glass for example for trimming the margins from a ribbon of float glass. The invention also comprehends the propagation of a crack from a weakened point on the glass surface by causing a controlled fracture to run along a preferred cutting line from that weakened point to a point near the other end of the path and completing the separation of the glass along that path, for example by a mechanical force.

The weakened point of the glass surface may take the form of a short score mark for example 1 to 2 mm. long on the surface of the glass or on the edge of the glass. Alternatively the weakened point may be a notch cut in the edge of the glass from which notch the controlled fracture begins.

The efficacy of the high frequency electric field in modifying thermally the condition of the glass along the preferred cutting line depends on the temperature and hence the electrical properties of the glass, as well as the thickness of the glass, and both the strength and frequency of the electric field can be regulated to modify the thermal condition of the glass so that the fracture is caused to run at a predetermined and desired rate through the glass along the desired cutting line.

It has indeed been found by reducing the field strength in the course of a fracture the run of the fracture can be stopped, and the fracture can be started again by restoring the field to former strength, the fracture running either in the same direction as a previous part of the fracture or, after a change in disposition of the field changes the direction of the fracture, the cutting line continues in a different direction through the glass.

The cut faces of the glass fractured by this method are found to have square profile with a mirror finish and are free from undesirable shelling or roughness which are characteristic of the normal method of cutting glass by scoring a score line on the glass with a diamond or wheel and then fracturing the glass along the score line.

The invention is particularly applicable to the cutting of shaped pieces of glass from a glass sheet for example for the cutting of vehicle windscreens, rear lights or side lights prior to bending and/or toughening. From this aspect the predetermined cutting line defines the glass shape to be cut and the electric field is regulated to cause the controlled fracture to run along that line at a predetermined rate, the shaped piece of glass being then separated from the remainder of the sheet.

The invention may also be employed for the cutting of sheets of glass from a continuous ribbon of glass which is advancing at a controlled rate, by generating the field through the thickness of the moving ribbon over a predetermined cutting line extending transversely of the ribbon, advancing the field with the ribbon so that the controlled fracture runs across the ribbon as it advances, and finally accelerating the cut sheet away from the end of the ribbon.

The cut sheets of glass are taken away from the end of the ribbon at an increased velocity to avoid abrasion between the cut surfaces of the glass. The field may be caused to move with the ribbon by clamping the electrodes between which the field is generated, to the glass so that the electrodes move with the advancing glass.

The invention can also be employed for cutting advancing flat glass along a cutting path parallel to its direction of advance, the field being a stationary field which is generated through a region of the glass extending in the direction of advance of the glass which field is regulated to hold stationary relative to the field the head of the controlled fracture which runs along the cutting line.

This technique can be applied to the trimming of the margins from an advancing ribbon of glass, for example a ribbon produced by the float process or by a vertical drawing process. From this aspect the invention provides for trimming margins from an advancing ribbon of glass by generating a stationary electric field through each margin of the ribbon extending over longitudinal paths embracing parallel cutting lines spaced in from the ribbon edges, passing the ribbon through these fields while regulating the fields to hold stationary the heads of controlled fractures along both margins of the advancing ribbon.

The invention can be employed for cutting a stack of sheets of glass and further includes cutting simultaneously a stack of sheets of glass by forming superimposed weakened points on the surfaces of the glass sheets and generating the electric field through the thickness of the stack of glass sheets to cause overlying fractures to run from the weakened points along identical cutting lines through the glass sheets.

The invention also comprehends apparatus for cutting glass comprising two electrodes spaced apart to permit insertion of the glass between the electrodes and presenting surface areas towards each other, means for positioning glass to be cut between the electrodes, and a high frequency generator connected to the electrodes to cause dielectric heating of the glass along a path embracing a predetermined cutting line through the glass defined by the said electrodes, said generator including means for regulating the power output to control the running of a fracture along said cutting line.

Preferably one of the electrodes is bar shaped with a flat face positioned to lie parallel to one surface of the glass and the other electrode is a rod of rounded cross section mounted parallel to the bar so as to face the other surface of the glass.

In an installation for cutting flat glass by the method of the invention there is provided a conveyor for supporting and conveying the glass, one of the electrodes being mounted relative to the conveyor on one side of the path of travel of the glass and the other electrode being mounted on the other side of the path of travel of the glass facing the first electrode, both electrodes extending parallel to the direction of travel of the glass.

When the invention is applied to the cutting of sheets of glass continually advanced along a horizontal conveyor one of the electrodes is mounted relative to the conveyor beneath the path of travel of the glass and the other electrode is mounted above the conveyor overlying the lower electrode. The conveyor has associated marking means aligned with the electrodes on the upstream side to weaken a point on the leading edge of the glass surface marking the beginning of a cutting line prior to the passage of the glass between the electrodes and mechanical means is positioned downstream of the electrodes for engaging either side of the cutting line to apply a mechanical force completing the separation of the cut pieces of glass.

The conveyor may be a gas bed conveyor with the lower electrode recessed in the bed.

For trimming the margins from a continuously advancing ribbon of glass there are two pairs of electrodes respectively positioned relative to the conveyor to sandwich the margins of the ribbon.

For cutting a shaped piece of glass from a glass sheet the electrodes may have the shape of the desired piece of glass.

One of the electrodes may be a flat plate for positioning beneath the glass while the other electrode is constituted by a plurality of electrode parts insulated from each other and individually connected in sequence by switching means to the generator output.

The invention also provides a piece of glass cut by a method according to the invention.

BRIEF DESCRIPTION OF THE DRAWINGS

FIG. 1 is a sectional elevation through a ribbon of glass across which a controlled fracture is being run by dielectric heating apparatus associated with the ribbon, FIG. 2 is a plan view of the apparatus of FIG. 1, FIG. 3 is a section on line III–III of FIG. 2, FIG. 4 is a perspective view of a corner of a piece of glass cut by the method of the invention, FIG. 13 is a section on line XIII–XIII of FIG. 16, FIG. 14 is a plan view of an advancing ribbon of glass supported on a horizontal conveyor showing the trimming of the margins from the ribbon, FIG. 15 is a section on line XV–XV of FIG. 14, FIG. 16 is a sectional elevation illustrating the cutting of a sheet of glass advanced over a gas bed conveyor, FIG. 17 illustrates the cutting of a stack of sheets of glass by the method of the invention.

DESCRIPTION OF THE PREFERRED EMBODIMENTS

Figure 5:
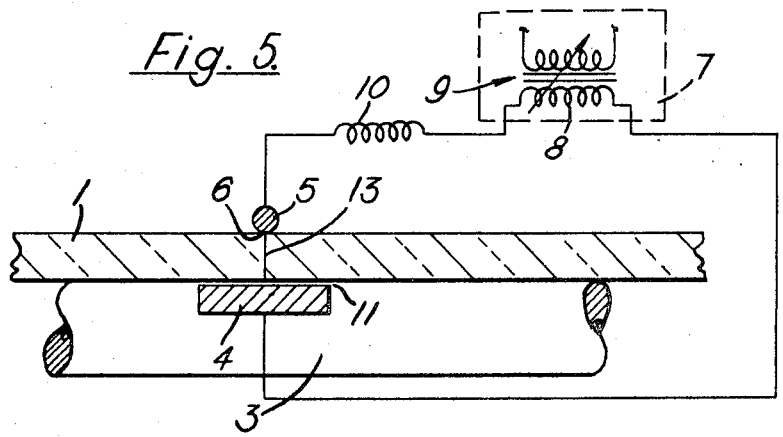
FIG. 5 is a sectional, elevation similar to FIG. 1 illustrating the propagation of controlled fracture through a sheet of glass in the direction of advance of that glass sheet.

In the drawings the same references indicate the same or similar parts.

Referring to FIGS. 1 and 2 of the drawings a ribbon of soda/lime/silica glass 1 to be cut is advanced in the direction of arrow 2 on conveyor rollers 3. Disposed between a pair of the conveyor rollers 3 are two electrodes 4 and 5 between which the glass 1 passes. A bar-shaped electrode 4 of aluminum for example is positioned beneath the ribbon and extends right across the ribbon, the length of the electrode 4 being the same as the width of the ribbon 1 so that the electrode does not protrude beyond the margins of the ribbon. A cylindrical rod-shaped electrode 5 is positioned on the top surface of the ribbon and is centrally and symmetrically disposed above the lower electrode 4. The electrode 5 is also of aluminum.

A small air gap exists between the electrode 4 and the underface of the glass, and the electrode 5 is in line contact along a line 6 with the upper face of the glass. The area of the bottom electrode 4 is selected to ensure that adequate capacitance exists between the electrodes to permit generation of a desired field strength through the thickness of the ribbon of glass along a path across the glass which embraces the predetermined cutting line.

The electrodes 4 and 5 are of blunted shape to discourage any electrical discharge or corona effects around the electrodes while ensuring that the heating electric field extends through the thickness of the glass along the path which embraces predetermined cutting line. In FIG. 1 the path is defined by the outer limits of the lower electrode 4 and the dielectric heating of the glass through this path ensures that the glass is heated uniformly through its thickness along the predetermined cutting line.

A high frequency power generator is indicated at 7. This generator is of known kind and for example has a power output at a frequency of 27 megacycles per second and a rating of 5 kilowatts. The output voltage is of the order of 10 kilovolts. One end of the output coil 8 of the output transformer 9 of the generator is connected through a tuning coil 10 to the top electrode 5 and the other end of the secondary winding 8 is connected to the bottom electrode 4. The coil 10, which comprises a small number of turns, tunes the condenser consisting of the electrodes 4 and 5 with the intermediate glass as dielectric.

The transformer 9 includes means for altering the magnetic coupling between the tank coil and output coil, in known manner to regulate the power supplied to the electrodes and thus the dielectric heating of the glass.

In one example of operation when cutting glass 6 mm. thick by the method of the invention the lower electrode is an aluminum bar whose sectional dimensions are 2.5 cm. by 6 mm. and an air gap of 1.5 mm. exists between the bottom surface of the glass and the top surface of the electrode 4. This air gap is indicated by the reference number 11 in FIG. 1. The upper electrode 5 is an aluminum rod 6 mm. in diameter which is in line contact with the upper surface of the glass.

The glass advanced along the conveyor is usually at room temperature, and is in any case at a temperature well below its strain point so that it can support stress necessary for propagation of the crack.

The electrodes 4 and 5 are held in insulating mountings (not shown) so that they can be moved with the advancing glass by a mechanism (not shown) which is driven in synchronism with the conveyor rollers 3 after the electrodes have been clamped relative to the glass, so that the high frequency electric field generated through the thickness of the glass modifies thermally the stress condition of the glass along the desired cutting line and a fracture is propagated through the glass along the line of contact of the upper electrode 5 with the glass, from a short score mark for example about 1 or 2 mm. long which is indicated at 12 in FIG. 3 as being made on the upper surface at one edge of the glass. This short score mark is exaggerated in the drawings for the sake of clarity.

The power output from the generators 7 is adjusted so that the fracture through the thickness of the glass runs at a suitable rate commensurate with the rate of advance of the ribbon. The head of the fracture is indicated by the line 13 in FIG. 3 and advances through the glass leaving the cut faces of the glass with a mirror finish as indicated at 14 in FIGS. 3 and 4.

FIG. 4 shows this mirror finished, cut face of the glass with a square profile, the upper and lower edges 15 of the cut face being clean square cut edges without any roughness.

With a 27 megacycle per second, 10 kilovolt, 4 kilowatt output the fracture runs across glass 6 mm. thick at a rate of about 200 cm. per minute.

The fracture does not normally run right to the opposite edge of the glass sheet because, at the normal temperatures of operation around room temperature the tip of the crack reaches a distance from the opposite edge of the glass sheet at which the width of uncut glass remaining, which has nevertheless been thermally treated by the dielectric heating, is insufficient to support the stress concentration necessary to ensure propagation of the tip of the crack right to the edge of the sheet.

The imposition of a very small mechanical force tending to separate the cut sheet from the end of the ribbon has been found to be sufficient to ensure the crack propagates right along the cutting path. By accelerating the cut sheet away from the end of the cut ribbon the necessary mechanical force is applied to the cut sheet to part it from the end of the ribbon.

The method of the invention can equally be employed with stationary glass which is supported between the two electrodes with the crack being propagated along the preferred cutting path through the glass by suitable control of the electric field. The mechanical force employed to separate the cut piece of glass ensures the final propagation of the crack over the small distance completing the separation. In the stationary position glass of thicknesses 3 mm. to 3 cms. has been cut. With the thicker glasses the power output from the generator is increased, e.g. to 5 kilowatts in order to effect the desired thermal modification of the glass over the region enclosing the preferred cutting path.

Figure 6:
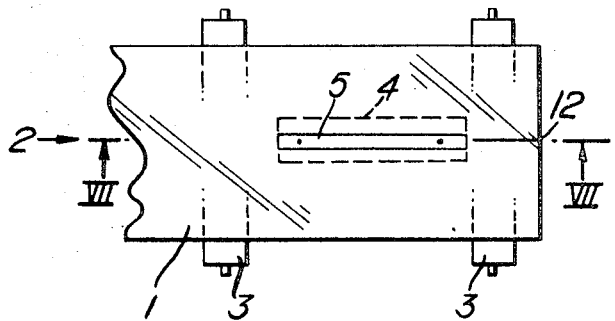
FIG. 6 is a plan view of the apparatus of FIG. 5.
Figure 7:
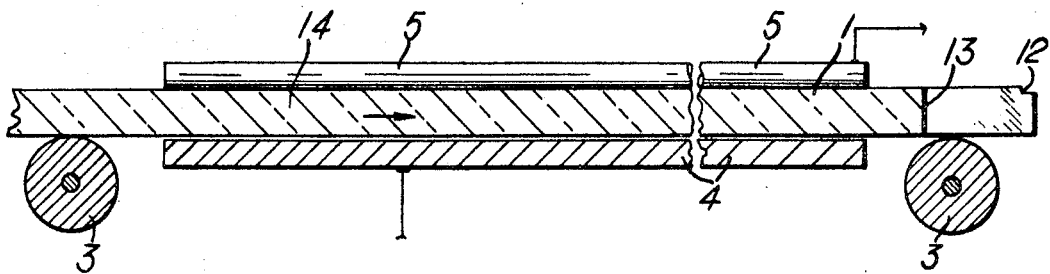
FIG. 7 is a section on line VII–VII of FIG. 6.

FIGS. 5 to 7 illustrate the cutting of advancing flat glass along a cutting path parallel to its direction of advance. A sheet of glass 1 is advanced at a controlled rate by the conveyor rollers 3 and the electrodes 4 and 5 are positioned relative to the conveyor so that a central region of the glass sheet passes between the electrodes which lie parallel to the direction of advance of the glass.

The short score mark 12 is made on the leading edge of the sheet so as to be aligned with the electrodes 4 and 5 and the power supplied is such that the head 13 of the fracture lies stationary just downstream of the electrodes 4 and 5.

With the glass at room temperature and a 27 megacycle per second supply with 10 kilovolts, 4 kilowatts output, glass of thickness in the range 3 mm. to 6 mm. can be cut at a rate of 125 cm. to 250 cm. per minute, and glass of thickness in the range 6 mm. to 25 mm. can be cut at a rate of 60 cm. to 125 cm. per minute.

Figure 8:
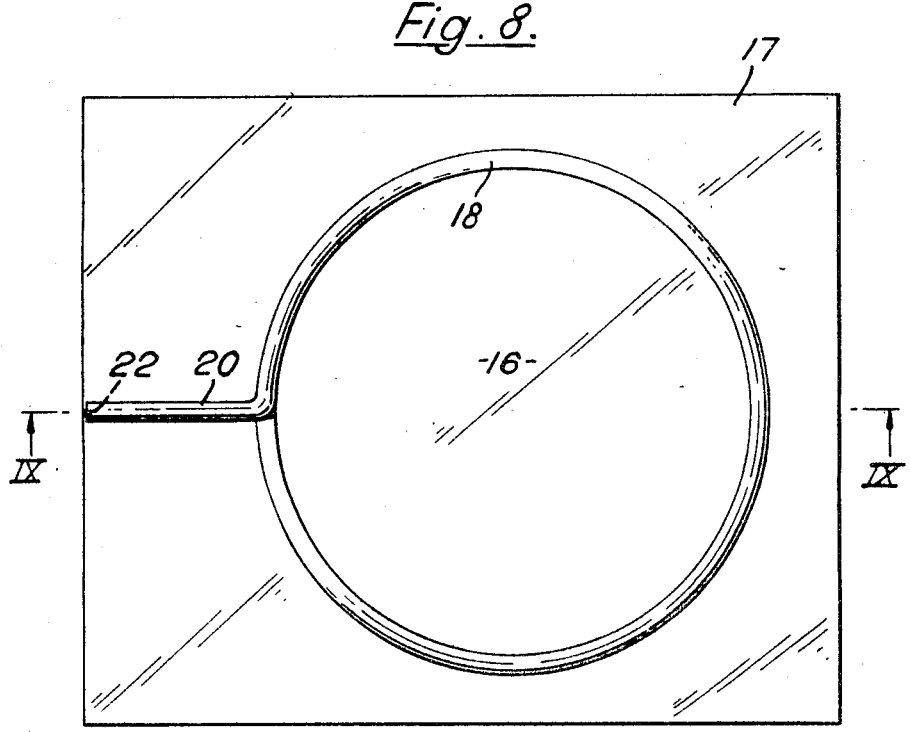
FIG. 8 illustrates the application of the invention to the cutting of a circular piece of glass from a sheet of glass.
Figure 9:
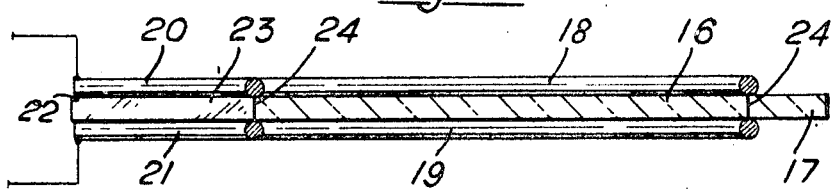
FIG. 9 is a section on line IX–IX of FIG. 8.

FIGS. 8 and 9 illustrate the application of the invention to the cutting of a disc of glass 16 from a square plate of glass 17.

Two ring-shaped electrodes 18 and 9 are respectively placed opposite each other on the upper and lower surface of the glass. There is line contact with the glass by both electrodes and the diameter of the electrodes is chosen so that sufficient capacitance exist between them to enable an oscillating field of desired strength to be generated through the thickness of the glass. Both electrodes have straight lead in portions 20 and 21 and a short score mark 22, which is exaggerated in the drawings, is made at one side of the glass plate between the straight parts 20 and 21 of the electrodes. When the power is supplied from the generator 7 to the electrodes fracture begins from the score mark 22 and runs between the straight parts 20 and 21 and then turns around the circular part of the electrodes 18 and 19.

The cut face between the straight parts of the electrodes is indicated at 23 and the crack which is propagated at a controlled rate around the electrodes is indicated at 24. The rate of propagation is of the order of 200 cm. per minute but the operation of the generator control of this rate to be effected. For example with a constant output frequency of 27 megacycles per second the power may be reduced as the fracture reaches the end of the straight portions 20 and 21 of the electrodes so that it is turned around the circular part of the electrodes at a slower rate and is speeded up again once the propagation of the circular part of the fracture has been established.

The fracture does not run all the way around the circular part of the cutting line back to the straight part but stops adjacent the straight part and a slight mechanical force is necessary to complete the running of the fracture to the straight part of the cutting path thereby completing the cutting of the disc from the sheet of glass.

Figure 10:
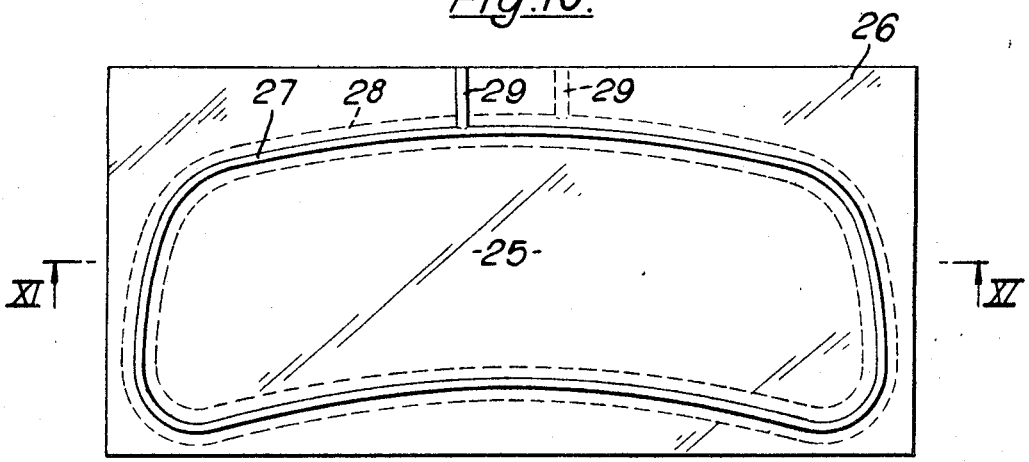
FIG. 10 is a plan view of the disposition of electrodes according to the invention for cutting a windscreen glass from a sheet of glass.
Figure 11:
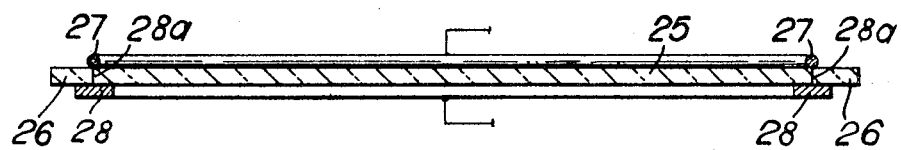
FIG. 11 is a section on line XI–XI of FIG. 10.

FIGS. 10 and 11 illustrate the cutting of a windscreen glass 25 from a sheet of glass 26. The upper electrode 27 is of cylindrical section so that there is line contact with the upper surface of the glass while the lower electrode 28 is of rectangular section in the same way as illustrated in FIG. 1. The predetermined cutting line lies beneath the line of contact of the upper electrode with the glass and is indicated at 28a. The leading sections of the electrodes 29 may not necessarily overlie each other, thereby minimizing the electric insulation problems, although they may lie opposite each other in the same way as FIGS. 5 and 6 in order to produce a lead into the shaped fracture. The fracture may be started from a weakened point on the upper surface of the glass, and slight mechanical force is necessary to separate the cut piece of glass from the sheet.

Figure 12:
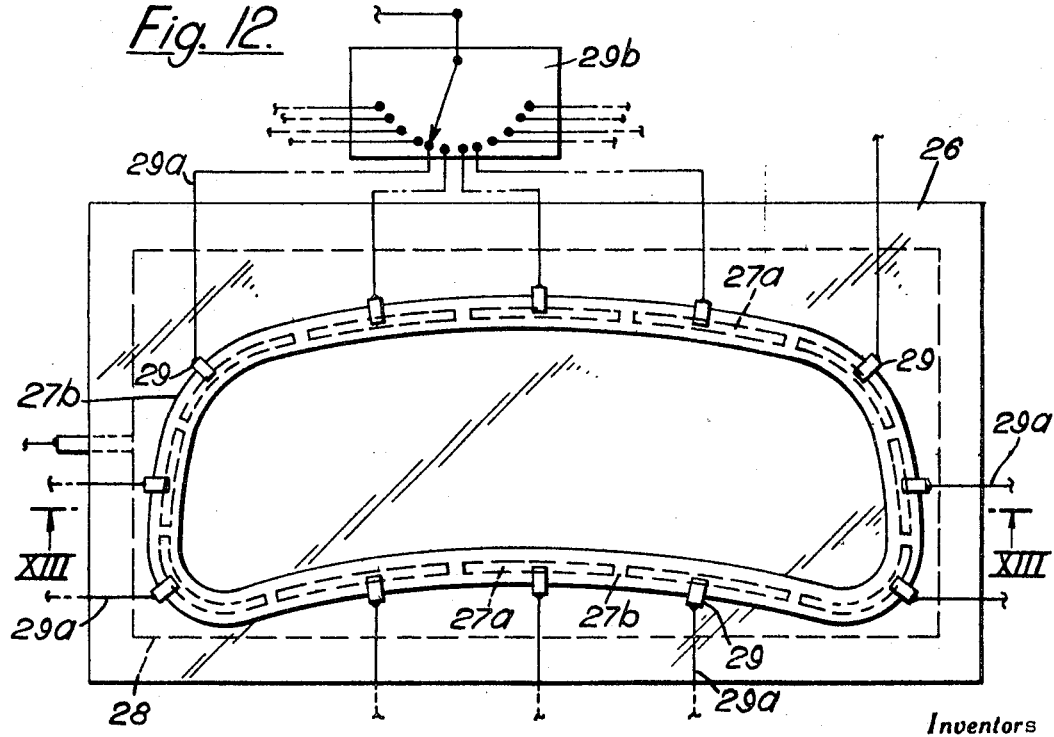
FIG. 12 is a diagrammatic plan view of another embodiment of the invention for cutting a shaped piece of glass.

Another way of cutting a windscreen glass from a glass sheet is illustrated in FIGS. 12 and 13. The lower electrode 28 is in the form of a flat plate whose outer dimensions are slightly greater than the dimensions of the windscreen glass being cut. The upper electrode is constituted by a plurality of electrode parts 27a which are insulated from each other, being encapsulated in an insulating epoxy resin 27b to form an upper frame which can be placed on the upper surface of the glass.

The electrode parts 27a are of cylindrical cross section and make line contact with the upper surface of the glass, and are shaped so that this line contact defines the predetermined cutting line for producing the shaped windscreen glass.

Each of the electrode parts has an associated strip connector 29 which projects through the frame and is set into its upper surface.

Individual lines 29a connect the strip connectors 29 to the outputs of a cyclic switching means which is illustrated diagrammatically at 29b and which is connected to one output of the generator.

The electrode parts 27a can thus be energized in sequence to cause the cutting field to move around the cutting path at the desired speed of cut. Several cycles of energization of the electrode parts 27a may be employed to effect preliminary heating of the cutting path before the fracture begins to run.

This method is particularly useful for cutting large shapes with a low power generator.

FIGS. 14 and 15 illustrate the trimming of margins from an advancing ribbon of glass. There are two pairs of electrodes, the upper 30 being of cylindrical section and the lower 31 of rectangular section 31, mounted above and below respectively the path of travel of the margins of a ribbon of glass 1 advancing on conveyor rollers 3. As the ribbon passes between the electrodes high frequency fields are generated through the thickness of the glass and the fields are regulated in relation to the thickness of the glass and the temperature of the glass so that a controlled fracture runs effectively into the advancing ribbon of glass. The control of the fractures by the fields is such that the heads of the fractures are held stationary within or relative to the electrodes. After the margins 32 and 33 have been trimmed from the advancing ribbon in this way, the trimmed ribbon advances to a transverse cutting station on central conveyor rollers 34. Side rollers which are skewed at an angle to the central rollers 34 are indicated at 35 and 36 and these rollers part the fracture so that the cut faces of the margins and of the central part of the ribbon do not abrade against with each other.

Control of the frequency of the generator 7 also affects the propagation of the fracture, and the frequency may be increased to 100 megacycles per second or higher e.g. 1000 megacycles per second.

Apparatus for cutting sheets of glass continually advanced along a horizontal conveyor is illustrated in FIG. 16. The conveyor is a gas bed conveyor indicated diagrammatically at 40. The gas hearth 40 is formed of electrically insulating material which may be porous or may be apertured for release of gases above the gas hearth to form the gas bed. Such apertures are indicated at 41. Gas is supplied to a plenum chamber 42 beneath the hearth 40, through a gas supply duct 43. Usually the gas supplied is air at room temperature and a sheet of glass 44 to be cut is placed onto the bed downstream of the electrodes 4 and 5. The electrode 4 is supported in a recess 45 in the hearth 40 and the electrode 5 is mounted above the gas hearth on a support 46 which may be electrically conductive to carry high frequency current to the electrode 5. Air is supplied under pressure to the gas hearth in known manner so that the glass floats above the hearth as indicated and driving means of known kind, not illustrated, are provided for engaging one edge or both edges of the glass sheet to advance the glass sheet over the gas hearth between the electrodes 4 and 5.

A scoring wheel 47 is mounted on the lower end of a ram 48 moveable in a cylinder 49 and as the glass sheet moves towards the electrode the ram 48 lowers the scoring wheel to press onto the leading edge of the glass surface to weaken a point 12 on the leading edge marking the beginning of the cutting line. The scoring wheel 47 is aligned with the upper electrode 5 so that the weakened point 12 on the leading edge of the glass sheet passes immediately between the electrodes 4 and 5.

The glass is heated over the path embracing the preferred cutting line and the power supplied to the electrodes 4 and 5 is such as to maintain the head 50 of the fracture stationary relative to the electrodes 4 and 5. The fracture is propagated almost to the trailing edge of the glass sheet and a cam-operated mechanical finger 51 is actuated as the trailing edge of the glass sheet passes beyond the electrodes to cause the fracture to run to the trailing edge of the glass sheet along the preferred cutting path defined by the field generated through the glass by the electrodes.

It has been found possible to cut a stack of sheets of glass simultaneously. FIG. 17 illustrates a stack of five sheets of glass 6 mm. thick which are held together, and a score line 52 is formed right down one edge of the stack of sheets. The sheets are stationary in the embodiment illustrated and are supported above the bar-shaped electrode 4 and the rod-shaped electrode 5 is laid onto the top of the stack so as to overlie the score line 52 formed on the edge of the sheet.

When power is supplied the stack of sheets are heated uniformly through their thickness over the path of the predetermined cutting line and overlying fractures 53 run from the score line 52 along identical cutting lines through the glass sheets which are thus separated into two stacks. Shapes can be cut from a stack of sheets of glass by the method of the invention for example discs of glass similar to the disc cut in FIGS. 8 and 9 or shaped pieces of glass for example windscreen glasses, employing the techniques illustrated in FIGS. 10 to 13.

When cutting stacks of sheets of glass it has been found that the controlled fractures are not necessarily propagated at exactly the same speed through the sheets of the stack, due to the differing stress states of the sheets of glass but the fractures through the sheets do overlie each other and any difference in speed of propagation of these fractures is not detrimental.

The rate at which the fracture is propagated through the glass depends on the temperature of the glass, which must not be so high that the desired strain energy for propagation of the crack is not present in the region of the head of the crack. Glass can be adequately cut by the method of the invention at room temperature, but at higher temperatures, for example by raising the glass to 70° C. or 80° C., the speed of propagation of the fracture is found to be much higher and in the continuous processes for example as illustrated in FIGS. 5 to 7 and FIGS. 14 and 15 speeds are 5 or 6 meters per minute for the propagation of the crack have been possible. That is, the head of the fracture remains stationary while the ribbon is advanced at a speed of the order of 5 or 6 meters per minute.

It has been found that some residual stress in the glass does not effect the efficiency or accuracy of cutting. Sheets of glass can be cut from a ribbon of glass advancing through the cool end of an annealing lehr, for example the lehr through which the float ribbon is advancing, so that sheets of annealed glass are removed from the outlet end of the lehr. Operation at higher temperatures for example up to 400° C. in the annealing lehr facilitates the cutting since the loss factor in the glass is higher at the higher temperature and the thermal modification of the stresses in the region enclosing the cutting path is capable of even more accurate control and enhances achievement of higher speeds of cutting.

The invention also comprehends a cut piece of glass cut by a method according to the invention which glass has a cut face having a sharp-edged, square profile and a mirror finish.

We claim:

1. A method of cutting advancing flat glass along a predetermined cutting path parallel to its direction of advance, comprising generating a stationary high frequency electric field through a region of the glass accommodating a cutting line extending in its direction of advance so as to heat the glass through its thickness along that line to a temperature which is above that of the surrounding glass and at which the glass can support stress, to cause a controlled fracture to run along the cutting line, passing the glass through that field, and regulating the field to hold stationary relative to the field the head of the controlled fracture which runs along said cutting line.

2. A method according to claim 1, for trimming margins from an advancing ribbon of glass, comprising generating a stationary electric field through each margin of the ribbon extending over longitudinal paths embracing parallel cutting lines spaced in from the ribbon edges, passing the ribbon through these fields while regulating the fields to hold stationary the heads of controlled fractures along both margins of the advancing ribbon.

3. A method of cutting simultaneously a stack of sheets of glass along a predetermined line, comprising forming superimposed weakened points on the surfaces of the glass sheets, and generating a high frequency electric field through the thickness of the stack of glass sheets along a path which embraces the cutting line to heat the glass through its thickness along that line to a temperature which is above that of the surrounding glass and at which the glass can support stress, to cause overlying controlled fractures to run from the weakened points along identical cutting lines through the glass sheets.

4. A method of cutting glass comprising subjecting the glass to a high frequency electric field through its thickness along a path embracing a predetermined cutting line extending from a weakened point on the glass surface to heat the glass uniformly through its thickness along that path to a temperature at which the glass can support stress, regulating the dielectric heating of that region of the glass in relation to the initial temperature and thickness of the glass to cause a controlled fracture to run along that line from the weakened point to a point near the other end of the path, and applying force to the glass to complete the separation of the glass along that line.

5. A method according to claim 4, comprising subjecting the glass to said high frequency electric field along a path embracing a predetermined cutting line defining a glass shape to be cut, regulating the electric field to cause the controlled fracture to run around said line at a predetermined rate, and separating the shaped piece of glass from the remainder of the sheet.

6. A method according to claim 4, for cutting a sheet of glass from a continuous ribbon of glass which is advancing at a controlled rate, comprising generating said field through the thickness of the moving ribbon over a predetermined cutting line extending transversely of the ribbon, advancing the field with the ribbon so that the controlled fracture runs across the ribbon as it advances, and accelerating the cut sheet away from the end of the ribbon.